US007624401B2

(12) United States Patent
Snover et al.

(10) Patent No.: US 7,624,401 B2
(45) Date of Patent: *Nov. 24, 2009

(54) REFLECTION-BASED PROCESSING OF INPUT PARAMETERS FOR COMMANDS

(75) Inventors: Jeffrey P. Snover, Woodinville, WA (US); James W. Truher, Bellevue, WA (US); Daryl W. Wray, Redmond, WA (US); Kaushik Pushpavanam, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/883,492

(22) Filed: Jun. 30, 2004

(65) Prior Publication Data

US 2005/0004973 A1 Jan. 6, 2005

Related U.S. Application Data

(63) Continuation of application No. 10/438,234, filed on May 12, 2003.

(51) Int. Cl.
*G06F 3/00* (2006.01)
*G06F 9/44* (2006.01)
*G06F 9/46* (2006.01)
*G06F 13/00* (2006.01)

(52) U.S. Cl. ...................... 719/320; 715/762

(58) Field of Classification Search ......... 719/313–316, 719/320, 328–332; 707/1, 10; 717/104–119, 717/136–161; 715/762
See application file for complete search history.

(56) References Cited

U.S. PATENT DOCUMENTS

| 5,450,600 | A  | * | 9/1995 | Abe ........................... 717/114 |
| 5,845,300 | A  | * | 12/1998 | Comer et al. ............... 715/508 |
| 6,266,666 | B1 | * | 7/2001 | Ireland et al. ................. 707/10 |
| 6,286,035 | B1 | * | 9/2001 | Gillis et al. ................. 709/206 |
| 6,334,158 | B1 | * | 12/2001 | Jennyc et al. ............... 719/328 |
| 6,405,365 | B1 | * | 6/2002 | Lee ............................ 717/106 |
| 6,724,408 | B1 | * | 4/2004 | Chen et al. .................. 715/853 |
| 6,871,283 | B1 | * | 3/2005 | Zurko et al. .................. 726/10 |
| 6,907,572 | B2 | * | 6/2005 | Little et al. ................. 715/762 |
| 2001/0052030 | A1 |   | 12/2001 | Shiraishi |
| 2002/0087408 | A1 | * | 7/2002 | Burnett ........................ 705/14 |
| 2007/0074324 | P1 |   | 3/2007 | Larsen |

OTHER PUBLICATIONS

Lawrence, jcmdline Package User Guide Release 1.0.3, Oct. 29, 2002.*

(Continued)

*Primary Examiner*—Diem K Cao
(74) *Attorney, Agent, or Firm*—Lee & Hayes, PLLC (57) ABSTRACT

The present invention is directed at a reflection-based shell that provides reflection-based processing of input parameters for a command. The reflection-based processing includes parsing, data generation, data validation, object encoding, object processing, documentation, and the like. The reflection-based shell provides a mechanism for specifying a grammar for the input parameters using a class. The method includes receiving a parsable stream that includes a command and at least one parameter. Retrieving definitional information that describes an expected parameter for the command. Using the definitional information to create an object for storing the at least one parameter in a format in accordance with the description of the expected parameters. Passing the object to the command. The object not having a method invocable by the command.

17 Claims, 4 Drawing Sheets

OTHER PUBLICATIONS

Jones, Parse and VAlidate Command Line Parameters with VB.NET, Devx.com, Dec. 4, 2002, pp. 1-6.*

Lawrence, jcmdline Package User Guide Release 1.0.1, Sourceforge.net, Dec. 13, 2002, pp. 1-9.*

Conway, Declarative Command-line Interfaces, School of Computer Science and Software Engeneering, Monach University, 1998, pp. 1-13.*

"CLIM: 27 Command Processing", retrieved on Feb. 13, 2007, at <<http://web.archive.org/web/20020315184937/http://www.mikemac.com/mikemac/clim/commands.html>>, pp. 1-11.

Conway, "Declarative Command-line Interfaces", pp. 13, Aug. 1998.

"Generic Command Line Parser", IBM Corporation, vol. 37, No. 05, 1994, pp. 55-58.

"Internet Archive Wayback Marchine", retreived on Feb. 13, 2007, at <<http://www.mikemac.com/mikemac/clim/commands.html>>, pp. 1.

Mckay, "CLIM: The Common Lisp Interface Manager", Communications of the ACM, vol. 34, No. 9, 1991, pp. 58-59.

"Validation of Parameter Subsets in Commands", IBM Corporation, vol. 37, No. 06B, 1994, pp. 585-587.

* cited by examiner

REFLECTION-BASED PROCESSING OF INPUT PARAMETERS FOR COMMANDS

RELATED APPLICATIONS

This is a continuation of U.S. patent application Ser. No. 10/438,234, filed May 12, 2003.

BACKGROUND OF THE INVENTION

System administration of multi-user computer systems is very specialized. The system administrators who are responsible for system administration are expected to know and understand commands that use inconsistent syntaxes, error reporting, and the like. These inconsistencies between the commands occur because the commands are written by several different software developers, each using their own style. The inconsistencies cause difficulties for the system administrators.

One difficulty relates to the usability of the commands. Having inconsistent commands makes system administration more difficult to learn and use. For example, some developers may prefer to use dashes ("-") between parameters, others may prefer forward slashes ("/"), and still others may prefer to use another unique syntax. The developers may each have their own style in reporting error messages too. Thus, the system administrator must know the syntax for each command and learn the format of each error message.

Another difficulty relates to the maintenance of the commands. For example, when the developer who wrote one of the commands leaves, someone else must discover the logic that was used. In order to discover the logic, the other developer must look at the code itself or look at documentation about the command. Neither of these methods is very desirable.

Prior attempts at making commands more consistent have focused on providing a library of routines that perform common functionality. While this library may decrease the amount of code used for performing common functionality provided by the library routines, the developers still use their own style in handling error conditions that arise from using any of the library routines. In addition, the use of the library does not affect the need for each command to contain logic for obtaining input parameters from the command line. Therefore, while using a library of routines may decrease some of the code that needs to be written, there is still a considerable amount of duplicative code that is generated for each command in order to perform parsing, data validation, and error reporting.

Therefore, there is a need for an environment in which input parameters to commands are obtained and processed in a more consistent manner while reducing the amount of code that is required for the command as well as providing consistent error messages during the parameter acquisition phase for all commands.

SUMMARY OF THE INVENTION

The present invention is directed at a reflection-based shell that provides reflection-based processing of input parameters for a command. The reflection-based processing includes parsing, data generation, data validation, object encoding, object processing, documentation, and the like. The reflection-based shell provides a mechanism for specifying a grammar for the input parameters using a class. Third party developers use the class to specify a grammar for their commands.

In operation, the present invention receives a parsable stream. The parsable stream may be obtained from a command line, voice input, a script, and the like. The parsable stream includes a command and at least one parameter. Based on the parsable stream, definitional information that describes an expected parameter for the command is retrieved. Using the definitional information, an object is created (i.e., an instance of the class created by the developer). The object stores the at least one parameter in a format in accordance with the description of the expected parameter. The object is then passed to the command, which does its unique processing. The definitional information may include directives that specify actions to be performed on the parsable stream, such as how to map the parameters to the expected parameter, how to obtain the parameters (e.g., interactive), and the like. The directives may also include actions related to parsing, validation, documentation, data generation, and data processing.

Thus, one advantage of the present invention is that command developers may easily specify a grammar for the input parameters to their command without needing to write the logic that parses the command line to get the input parameters or that validates the input parameters. In so doing, the present invention reduces the amount of code developers need to write and allows the syntax for commands to be more consistent, yet quite versatile.

DETAILED DESCRIPTION OF THE PREFERRED EMBODIMENT

Briefly stated, the present invention is directed at a reflection-based shell that provides reflection-based processing of input parameters for a command. As will become apparent after reading the following detailed description, the present invention minimizes the amount of code that third party developers need to write and minimizes the amount of knowledge that system administrators need to know in order to perform system administrative tasks. Therefore, the present invention significantly reduces system administrative tasks. In addition, the present invention provides a more consistent syntax for input parameters, and provides common functionality for the processing associated with the input parameters.

Figure 1:
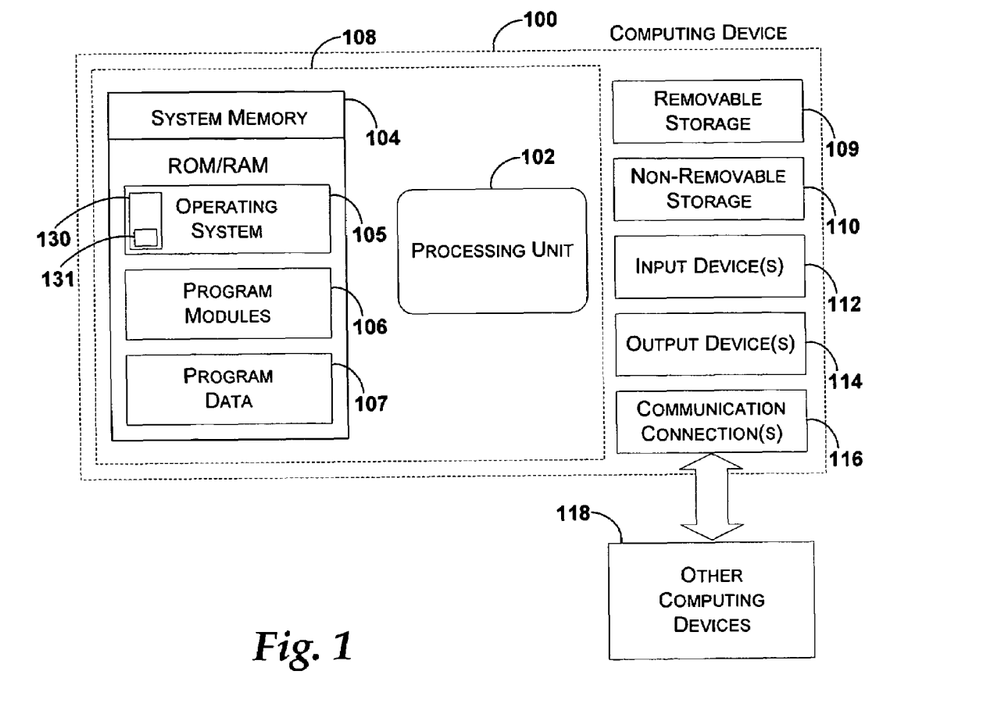
FIG. 1 illustrates an exemplary computing device that may be used in one exemplary embodiment of the present invention.

FIG. 1 illustrates an exemplary computing device that may be used in one exemplary embodiment of the present invention. In a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more program modules 106, and may include program data 107.

The operating system 105 includes a command processor 130 that executes operating system commands. The command processor 130 includes a shell 131 (i.e., the command processor interface) that accepts the operating system commands. The shell may display a command prompt, may display a graphical user interface, or any other means for inputting and interpreting user input. The shell 131 verifies that the entered commands are valid and sends the verified commands onto another part of the command processor 130 for execution. This basic configuration is illustrated in FIG. 1 by those components within dashed line 108.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included. These devices are well know in the art and need not be discussed at length here.

Computing device 100 may also contain communication connections 116 that allow the device to communicate with other computing devices 118, such as over a network. Communication connections 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Figure 2:
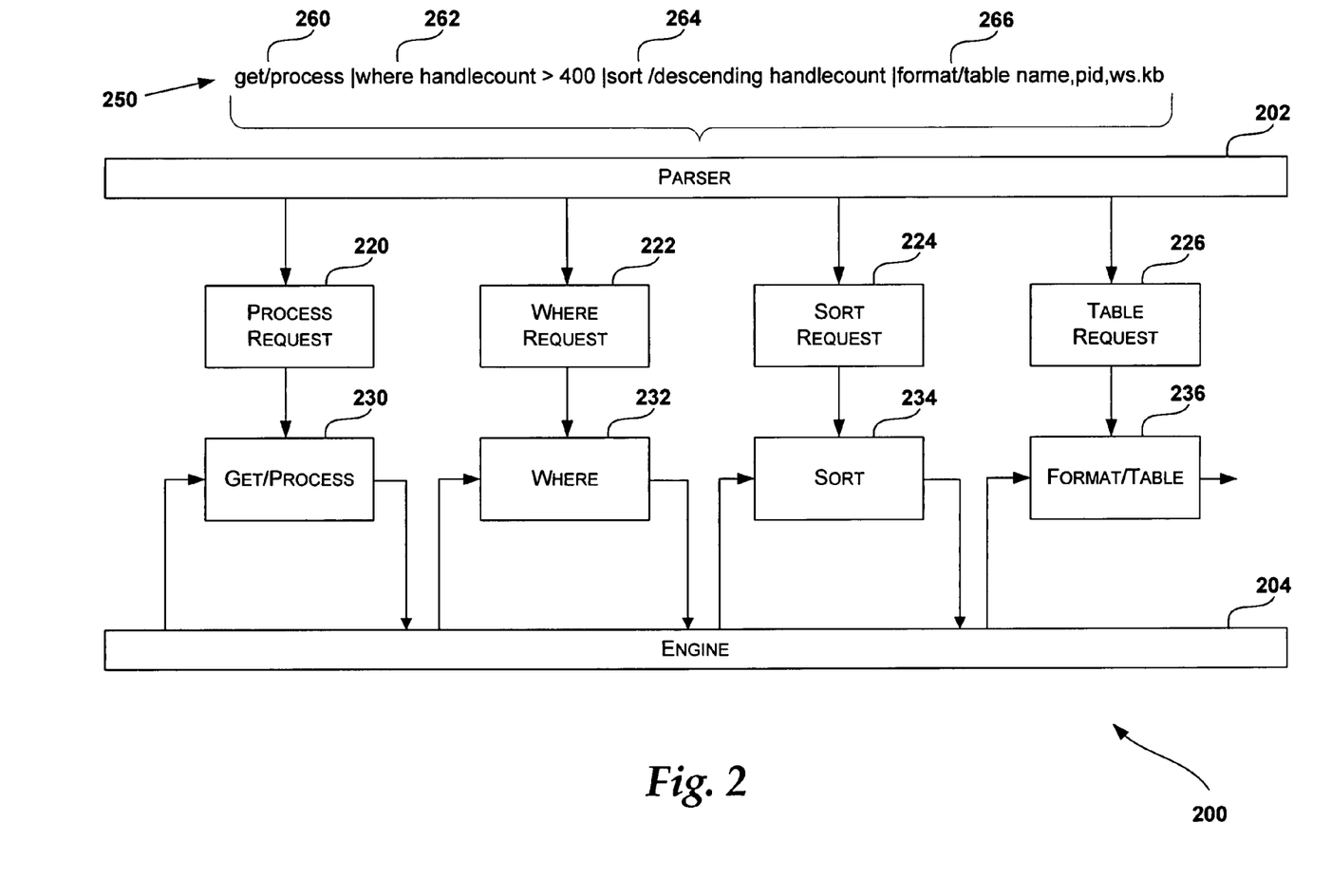
FIG. 2 is a functional flow diagram illustrating the processing of a command line through a parser and an engine within a reflection-based shell in accordance with the present invention.

FIG. 2 is a functional flow diagram illustrating the processing of a command line 250 through a parser 202 and an engine 204 within a reflection-based shell 200 in accordance with the present invention. The exemplary command line 250 pipelines several commands (i.e., process command 260, where command 262, sort command 264, and table command 266). However, the following discussion focuses on the reflection-based processing of input parameters for one command (e.g., where command 262). The reflection-based processing for the other commands is performed in a similar fashion. The command line 250 may pass input parameters to any of the commands (e.g., "handlecount>400" is passed to the where command 262). One will note that the process command 260 does not have any associated input parameters. In the past, each command was responsible for parsing the input parameters associated with the command, determining whether the input parameters were valid, and issuing error messages if the input parameters were not valid. Because the commands were typically written by various programmers, the syntax for the input parameters on the command line were not very consistent. In addition, if an error occurred, the error messages, even for the same error, were not very consistent between the commands.

For example, in a Unix environment, a "ls" command and a "ps" command have many inconsistencies between them. While both accept an option "-w", the "-w" option is used by the "ls" command to denote the width of the page, while the "-w" option is used by the "ps" command to denote print wide output (in essence, ignoring page width). The help pages associated with the "ls" and the "ps" command have several inconsistencies too, such as having options bolded in one and not the other, sorting options alphabetically in one and not the other, requiring some options to have dashes and some not.

As will be described in detail below, the present invention provides a more consistent approach and minimizes the amount of duplicative code that each developer must write. The reflection-based shell 200 provides a syntax (e.g., grammar), a corresponding semantics (e.g., a dictionary), and a reference model to enable developers to easily take advantage of common functionality provided by the reflection-based shell 200.

Before describing the present invention any further, definitions for terms appearing through-out this specification are provided. A "command" refers to a stand-alone executable program. A "commandlet" or "cmdlet" refers to programs that are considerably smaller than commands. In one embodiment, each cmdlet defines a noun-verb pair (e.g., get/process in command line 250). The following discussion uses the term cmdlet when referring to a command written in accordance with the present invention. However, in some instances, the more common term "command" may be used to refer to cmdlet. Input parameter refers to input-fields for a cmdlet. Argument refers to an input parameter passed to a command or cmdlet that is the equivalent of a single string in the argv array or passed as a single element in a RequestObject. As will be described below, a RequestObject refers to a mechanism for specifying a grammar for the cmdlet. An argument is one of an option, an option-argument, or an operand following the command-name. Examples of arguments are given based on the following command line:

findstr /i/d:\winnt;\winnt\system32 aa*b *.ini.

In the above command line, "findstr" is argument 0, "/i" is argument 1, "/d:\winnt;\winnt\system32" is argument 2, "aa*b" is argument 3, and "*.ini" is argument 4. An "option" is an argument to a command or cmdlet that is generally used to specify changes to the program's default behavior. Continuing with the example command line above, "/i" and "/d" are options. An "option-argument" is an input parameter that follows certain options. In some cases, an option-argument is included within the same argument string as the option. In other cases, the option-argument is included as the next argument. Referring again to the above command line, "winnt;\winnt\system32" is an option-argument. An "operand" is an argument to a command or cmdlet that is generally used as an object supplying information to a program necessary to complete program processing. Operands generally follow the options in a command line. Referring to the example command line above again, "aa*b" and "*.ini" are operands. A "parsable stream" includes the arguments.

"Class members" refers to elements, such as sub-classes, fields, constants, methods, structures, properties, arrays, indexers, interfaces, events, exceptions, and the like. A "directive" refers to a metadata attribute. A "category" refers to a set of particular types of directives. As will be explained in detail below, the reflection-based shell of the present invention provides several categories of directives, such as parsing directives, data generation directives, and the like. Within each category, the reflection-based shell provides several directives. The categories and the directives may be extended by the software developers.

Referring to FIG. 2, parser 202 parses a parsable stream (e.g., command line 250) into RequestObjects 220-226 (e.g., where request 222). Each RequestObject 220-226 is associated with one of the cmdlets 260-266. Briefly, described in detail below in conjunction with FIG. 3, the RequestObjects 220-226 provide a means or mechanism for a developer to specify a grammar for the input parameters to the cmdlet. The RequestObject is passed to the corresponding cmdlet executable (e.g., where executable 232). However, as will be described below in conjunction with FIG. 4, parser 202 and engine 204 performs various processing on the input parameters specified on the command line 200 before passing the RequestObject to the cmdlet executable. The processing includes parsing, parameter validation, data generation, parameter processing, parameter encoding, and parameter documentation. Because parser 202 and engine 204 perform common functionality on the input parameters on the command line, the reflection-based shell 200 is able to issue consistent error messages to users. As one will recognize, the executable cmdlets 230-236 written in accordance with the present invention require less code than commands in prior systems. Each executable cmdlet 230-236 accepts a corresponding RequestObject 220-226. In addition, each executable cmdlet 230-236 outputs objects which are input to the next pipelined cmdlet. Typically, these objects are input by passing a reference (e.g., handle) to the object. The executable cmdlets 230-236 may then perform additional processing on the objects that were passed in.

Figure 3:
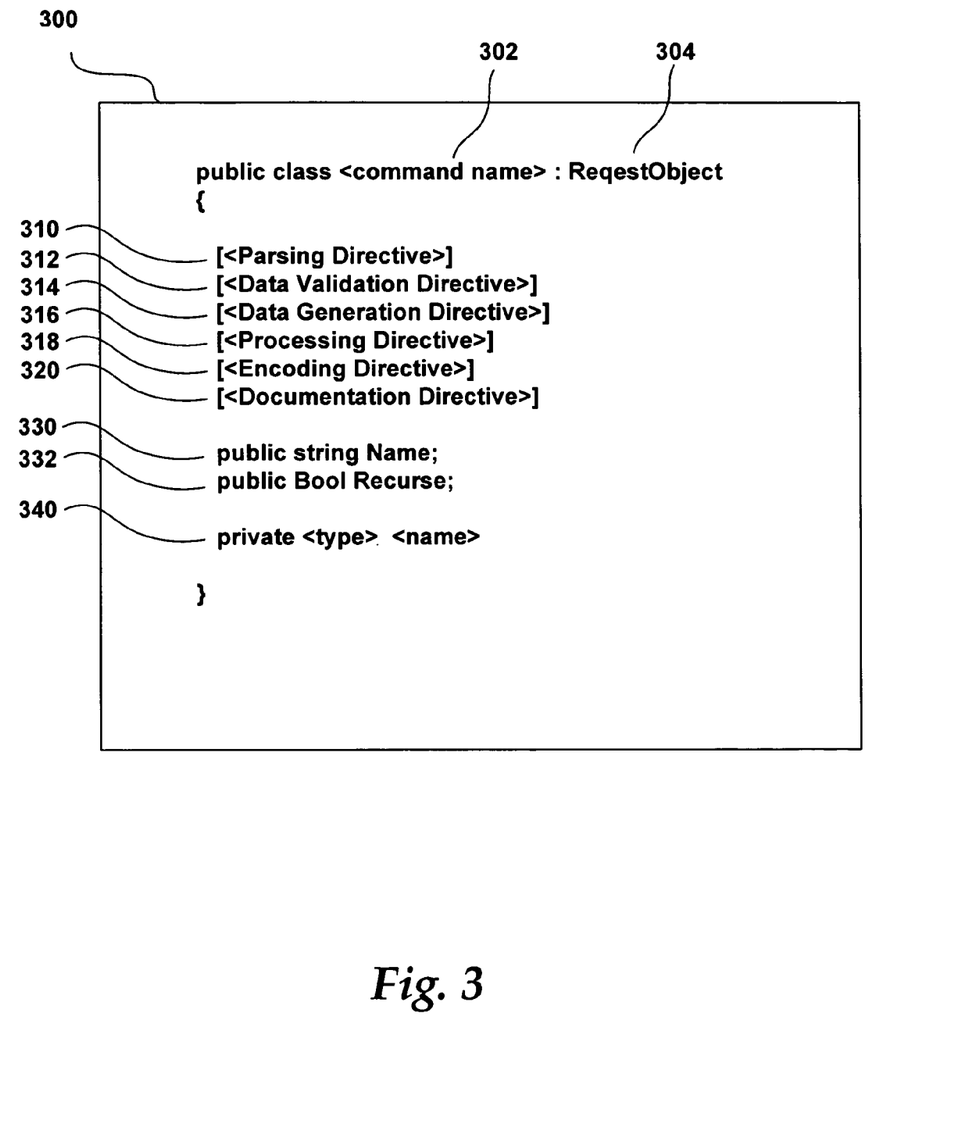
FIG. 3 is one embodiment for a data structure for specifying a grammar for input parameters for a command in accordance with the present invention.

FIG. 3 is one embodiment for a data structure 300 for specifying a grammar for input parameters to a cmdlet. In essence, the data structure 300 provides a means for clearly expressing a contract between the reflection-based shell and the cmdlet. The following discussion describes the present invention using the .NET Framework created by Microsoft Corporation of Redmond, Wash. However, other environments may be used without departing from the scope of the present invention.

A software developer codes data structure 300 within the code for the corresponding executable cmdlet. The methods and properties that implement this request actually define what input parameters are exposed to the user through the command line. Data structure 300 is a public class that derives from a RequestObject class 304. The software developer provides a class name 302 for the data structure 300. The class name 302 identifies the name of the argument specified on the command line for the cmdlet. Each command name 302 represents a verb/noun pair, such as "get/process" and "format/table" in the example command line 200 shown in FIG. 2. The verb or the noun may be implicit in the command name, such as the "where" command. One will note that, in one embodiment, the class name 302 is not identical to the cmdlet. In this embodiment, other annotation is used to identify the name of the cmdlet. Data structure 300 includes at least one public member (e.g., Name 330). The public members 330, 332 represent input parameters associated with the cmdlet.

Each public member 330, 332 may have one or more directives in each of the following categories: parsing directive 310, data validation directive 312, data generation directive 314, processing directive 316, encoding directive 318, and documentation directive 320. The directives are surrounded by square brackets and describe the input parameter that follows them. Some of the directives may also be applied at a class level, such as user-interaction type directives. The data structure 300 may also include a private member 340 that the parser recognizes as not an input parameter. The private member 340 may be used for storing data generated based on one of the directives.

The name for the public member may be used on the command line to qualify the input parameter on the command line. Otherwise, the public member may be used to store the input parameter based on its position on the command line. The following is an example that illustrates this concept, the RequestObject is as follows:

```
public class FileCopyRequest : RequestObject
{
    [ParsingParameterPositionAttribute(0)]
    public string From;
    [ParsingParameterPositionAttribute (1)]
    public string To;
    ...
}.
```

ParsingParameterPostionAttributeis a parsing directive that describes how to map unqualified parameters based on position. As mentioned above, unqualified parameters are parameters that do no use the public member name in association with the input parameter. The following are proper syntaxes after applying the above parsing directives on the "To" and "From" members:

$ copy/File -From:a -To:b $ copy/File a b $ copy/File-From:a b $ copy/File a-To:b $ copy/File-To:b -From:a.

The following syntax would be invalid:

$ copy/File-To:b a.

$ copy/File b-From:a

As will be described below, other directives affect the processing of the input parameter specified on the command line. Thus, through the use of directives, cmdlet developers are allowed to easily specify a grammar for the input parameters to their cmdlets and perform processing on the input parameters without requiring them to generate any of the underlying logic.

The directives are stored in the metadata associated with the cmdlet. As will be described later in conjunction with FIG. 4, metadata processing is distributed throughout the reflection-based shell. For example, applicability directives, documentation directives, and parsing guideline directives are processed at a very early stage within the parser. Data generation directives and validation directives are processed in the engine once the parser has finished parsing all the input parameters.

The following tables illustrate representative directives for the various categories, along with an explanation of the processing performed by the reflection-based shell in response to the directive.

TABLE 1

Applicability Directives

| Name | Description |
|---|---|
| PrerequisiteMachineRoleAttribute | Informs shell whether element is to be used only in certain machine roles (e.g., File Server, Mail Server). |
| PrerequisiteUserRoleAttribute | Informs shell whether element is to be used only in certain user roles (e.g., Domain Administrator, Backup Operator). |

TABLE 2

Parsing Guideline Directives

| Name | Description |
|---|---|
| ParsingParameterPositionAttribute | Maps unqualified parameters based on position. |
| ParsingVariableLengthParameterListAttribute | Maps parameters not having a Parsing ParameterPosition attribute. |
| ParsingDisallowInteractionAttribute | Specifies action when number of parameters is less than required number. |
| ParsingRequireInteractionAttribute | Specifies that parameters are obtained through interaction. |
| ParsingHiddenElementAttribute | Makes parameter invisible to end user. |
| ParsingMandatoryParameterAttribute | Specifies that the parameter is required. |
| ParsingPasswordParameterAttribute | Requires special handling of parameter. |
| ParsingPromptStringAttribute | Specifies a prompt for the parameter. |
| ParsingDefaultAnswerAttribute | Specifies default answer for parameter. |
| ParsingDefaultAnswerScriptAttribute | Specifies action to get default answer for parameter. |
| ParsingDefaultValueAttribute | Specifies default value for parameter. |
| ParsingDefaultValueScriptAttribute | Specifies action to get default value for parameter. |

TABLE 3

Documentation Directives

| Name | Description |
|---|---|
| DocumentNameAttribute | Provides a Name to refer to elements for interaction or help. |
| DocumentShortDescriptionAttribute | Provides brief description of element. |
| DocumentLongDescriptionAttribute | Provides detailed description of element. |
| DocumentExampleAttribute | Provides example of element. |
| DocumentSeeAlsoAttribute | Provides a list of related elements. |
| DocumentSynopsisAttribute | Provides documentation information for element. |

TABLE 4

Data Validation Directives

| Name | Description |
|---|---|
| ValidationRangeAttribute | Specifies that parameter must be within certain range. |
| ValidationSetAttribute | Specifies that parameter must be within certain collection. |
| ValidationPatternAttribute | Specifies that parameter must fit a certain pattern. |
| ValidationLengthAttribute | Specifies the strings must be within size range. |
| ValidationTypeAttribute | Specifies that parameter must be of certain type. |
| ValidationCountAttribute | Specifies that input items must be of a certain number. |
| ValidationFileAttribute | Specifies certain properties for a file. |
| ValidationFileAttributesAttribute | Specifies certain properties for a file. |
| ValidationFileSizeAttribute | Specifies that files must be within specified range. |
| ValidationNetworkAttribute | Specifies that given Network Entity supports certain properties. |

TABLE 4-continued

Data Validation Directives

| Name | Description |
| --- | --- |
| ValidationScriptAttribute | Specifies conditions to evaluate before using element. |
| ValidationMethodAttribute | Specifies conditions to evaluate before using element. |

TABLE 5

Processing and Encoding Directives

| Name | Description |
| --- | --- |
| ProcessingTrimStringAttribute | Specifies size limit for strings. |
| ProcessingTrimCollectionAttribute | Specifies size limit for collection. |
| EncodingTypeCoercionAttribute | Specifies Type that objects are to be encoded. |

In the embodiment using the .NET Framework, each category has a base class that is derived from a basic category class (e.g., CmdAttribute). The basic category class derives from a System.Attribute class. Each category has a pre-defined function (e.g., attrib.func( )) that is called by the parser during category processing. The cmdlet developer may create a custom category that is derived from a custom category class (e.g., CmdCustomAttribute). The cmdlet developer may also extend an existing category class by deriving a directive class from the base category class for that category and override the pre-defined function with their implementation. The cmdlet developer may also override directives and add new directives to the pre-defined set of directives.

The order of processing of these directives may be stored in an external data store accessible by the parser. The reflection-based shell looks for registered categories and calls a function (e.g., ProcessCustomDirective) for each of the directives in that category. Thus, the order of category processing may be dynamic by storing the category execution information in a persistent store. At different processing stages, the parser checks in the persistent store to determine if any metadata category needs to be executed at that time. This embodiment allows categories to be easily deprecated by removing the category entry from the persistent store.

Figure 4:
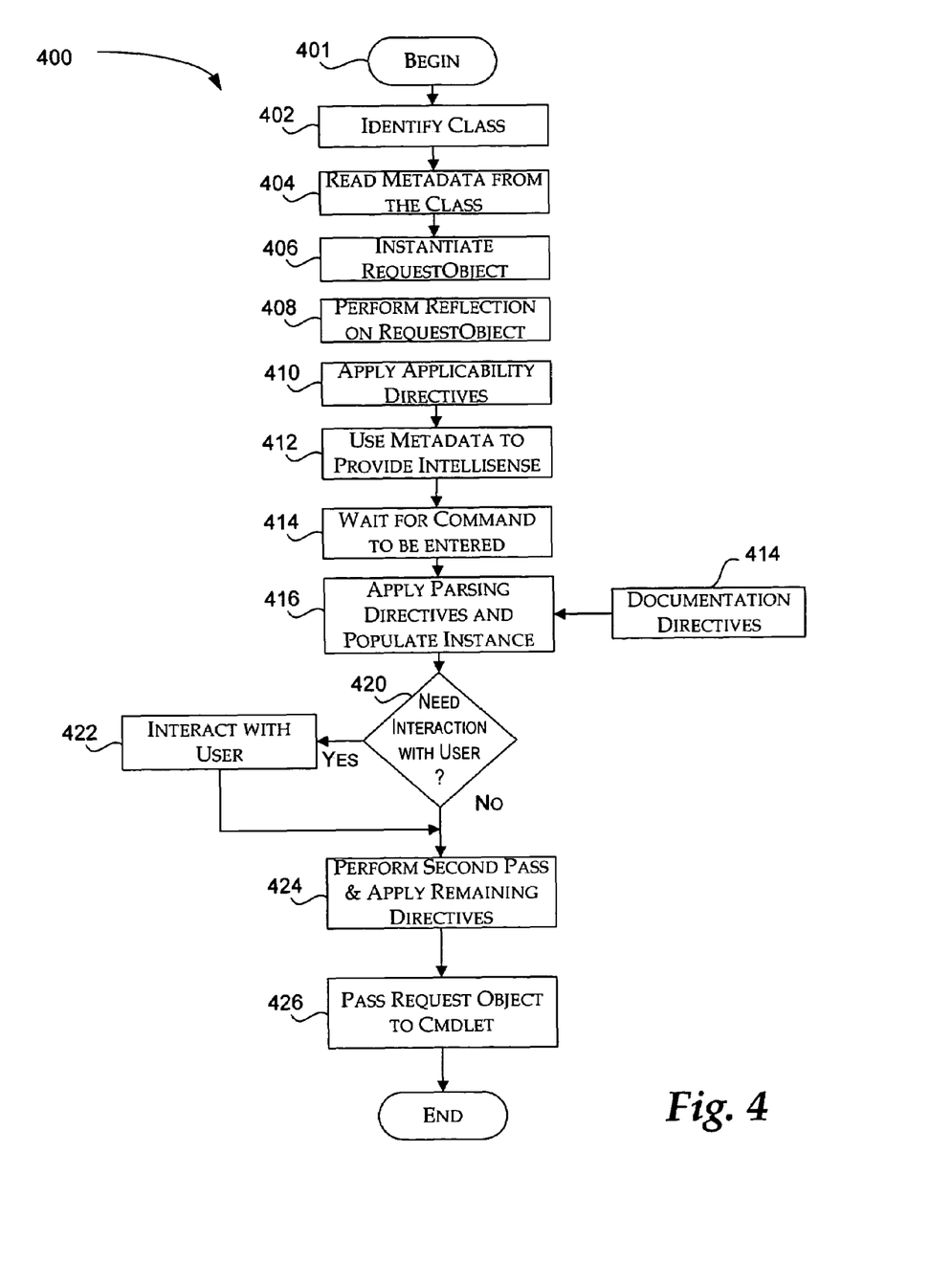
FIG. 4 is a logical flow diagram illustrating an exemplary process for handling input parameters entered on the command line within the reflection-based shell of the present invention.

FIG. 4 is a logical flow diagram illustrating a process 400 for handling input parameters entered for a command. At this point, the cmdlet has been developed and the metadata has been inserted into the cmdlet source file using the RequestObject shown in FIG. 3. The cmdlet has been compiled and has been registered. During registration, the class name (i.e., cmdlet name) was written in the registration store. The process 400 begins at block 401, where the reflection-based shell has received input (e.g., keystrokes) indicating a cmdlet. The reflection-based shell may recognize the input as a cmdlet by looking up the input from within the registry and associating the typed input with one of the registered cmdlets. Processing proceeds to block 402.

At block 402, the class associated with the identified cmdlet is identified. This class may also be identified through the registry. Processing continues at block 404.

At block 404, metadata associated with the class is read. The metadata includes any of the directives associated with the cmdlet. The directives may apply to the cmdlet itself or to one or more of the parameters specified in the RequestObject. During cmdlet registration, the registration code registers the metadata into a persistent store. The metadata may be stored in an XML file in a serialized format, an external database, and the like. As shown in the Tables above, the directives that are specified in the metadata are each associated with a category, such as Applicability Directives, Parsing Guideline Directives, and the like. Each category of directives is processed at a different stage in the reflection-based shell. Each metadata directive handles its own error handling. Processing continues at block 406.

At block 406, a RequestObject is instantiated based on the identified class. Processing continues at block 408.

At block 408, reflection is performed on the RequestObject to obtain information regarding the input parameters. The reflection-based shell provides a common interface for returning the reflection data (on a need basis) to the caller. In the embodiment described above, the reflection uses NET Reflection. Processing continues at block 410.

At block 410, applicability directives (e.g., Table 1) are applied. The applicability directives insure that the class is used in certain machine roles and/or user roles. For example, certain cmdlets may only be used by Domain Administrators. If the constraint specified in one of the applicability directives is not met, an error occurs. Processing continues at block 412.

At block 412, metadata is used to provide intellisense. At this point in processing, the entire command line has not yet been entered. The reflection-based shell, however, knows the input parameters that are allowed via reflection on the RequestObject associated with the cmdlet. Thus, the reflection-based shell via the engine may auto-complete the input parameter once a disambiguating portion of the input parameter has been typed on the command line. Auto-completion may occur as soon as the portion of the input parameter can identify one of the input parameters unambiguously. Processing continues at block 414.

At block 414, the process waits until the input parameters for the cmdlet have been entered. Typically, this occurs once the user has indicated the end of the command line, such as by hitting a return key. Processing continues at block 416.

At block 416, parsing guideline directives are applied and the RequestObject instance is populated with the input parameters. The parser has a set of rules that are used during the parsing. The set of rules specify the manner in which the grammar specified in the RequestObject data structure is converted into the syntax for the input parameters on the command line. For example, given the following RequestObject declaration for the command Foo:

```
class Foo : RequestObject
{
    string Name;
    Bool Recurse;
}
``` the command line syntax may be any of the following:
$Foo-Name: (string)-Recurse: True
$Foo-Name<string>-Recurse True
$Foo/Name (string).

The set of rules may be modified by system administrators in order to yield a desired syntax. In addition, the parser may support multiple sets of rules, so that more than one syntax can be used by users. Therefore, the grammar specified in the RequestObject structure (e.g., string Name and Bool Recurse) drives the parser.

In general, the parsing directives describe how the parameters entered on the command line should map to the expected parameters identified in the RequestObject. The following example illustrates parsing directives specifying positional information.

```
Class foo : RequestObject
{
        [ParsingParameterPositionAttribute(0)]
        String HostName
        [ParsingParameterPositionAttribute(1)]
        String AliasName
}.
```

The input parameter types are checked to determine whether correct. If the input parameter types are not correct, the input parameters may be coerced to become correct. If the input parameter types are not correct and can not be coerced, a usage error is printed. The usage error allows the user to become aware of the correct syntax that is expected. The usage error may obtain information describing the syntax from the Documentation Directives 418. Once the input parameter types have either been mapped or have been verified, the corresponding members in the RequestObject instance are populated. Processing continues at decision block 420.

At decision block 420, a determination is made whether any of the input parameters need interaction with the user. If any of the parameters need user interaction, the process proceeds to block 422. Otherwise processing continues at block 424.

At block 422, the reflection-based shell interacts with the user to obtain the input parameters. Developers may specify that input parameters be obtained through user interaction by specifying a CmdPgRequireInteraction directive for the parameter in the RequestObject. In addition, the reflection-based shell may determine that user interaction is needed if not all the input parameters are entered on the command line. As long as the input parameter, the cmdlet itself, and other settings do not disallow interaction, the reflection-based shell will interact with the user to obtain the necessary input parameter. A flag may be used to specify whether user interaction is allowed at the user level, group level, and enterprise-level. If one of the levels does not allow user interaction, an error message is issued. Once the user interaction has been performed, processing continues at block 424.

At block 424, the engine performs another pass on the RequestObject instance and applies any remaining directives to the input parameters. The remaining directives include data generation directives, data validation directives, object processing directives, and object encoding directives. These directives are processed in the engine once the parser has finished parsing the input parameters. A representative directive from each of the categories shown above in Tables 3-5 will now be described.

The first representative directive is from the data generation directive. The RequestObject may contain the following statements:
[ParsingDefaultAnswerScriptAttribute (Filename, F)]
String Name;
private Arraylist F;.

Because the Arraylist F is private, the parser does not treat this declaration as an input parameter to the cmdlet. Instead, the Arraylist F is temporary storage for the data that is generated by the service specified in the Data Generation directive. In the above example, the service is "Filename". Filename may be a utility provided by the reflection-based framework or may be a third party function or utility. When the engine encounters the above directive, the engine identifies a service named "Filename" within the registry. The registration of the service occurs during installation of the service. The Data Generation directive allows unique processing to occur on input parameters. For example, the service could perform wildcard expansion on a filename entered as "A*" on the command line. Before the second pass, the Name member contains "A*" as it was entered on the command line. During the second pass, the Filename service may locate a set of files starting with A and store them in the Arraylist F. As one skilled in the art will appreciate, not only will the Data Generation directive provide wildcarding expansion of filenames, but can also perform wildcard expansion of usernames, processes, and the like. In addition, the Data Generation directive may perform other processing on the input parameters.

An exemplary data validation directive may include the following statements within the RequestObject:
[ValidationSetAttribute ("Debug", "Production", "Test")]
[ParsingParameterMandatoryAttribute]
String Name;.

Given the above data validation directives, the parser recognizes that Name is a mandatory input parameter and the string must either be Debug, Production, or Test. Otherwise, the data validation directive will issue an error. The error may use documentation directives for supplying the error message.

An exemplary object processing directive may include the following statements within the RequestObject:
[tolower]
String HostName;.

Given the above object processing directive, the argument specified for the HostName is converted to a lower case string before handing the RequestObject to the executable cmdlet.

An exemplary object encoding directive may include the following statements within the RequestObject:
[TOIP (HostIP)]
String HostName;
Private IPaddr HostIP;.

Given the above object encoding directive, the string that was input as the HostName is converted to an IP address. The parser does not treat the HostIP parameter as an input parameter because it is declared as Private. However, the executable cmdlet may reference the HostIP member. While the above object encoding directive may not appear to save many lines of code, in reality, the directive reduces the amount of code written by third party developers quite substantially. For example, in prior environments, a third party developer handles error processing. In addition, if the error message is a string, the string may need to be converted into multiple languages. However, the present invention provides uniform error handling. In addition, the present invention provides a mechanism for uniformly converting the error message to multiple languages. Processing continues at block 426.

At block 426, the RequestObject instance is passed to the executable cmdlet. The executable cmdlet will then use these input parameter in its processing. Thus, contrary to prior command implementations, the cmdlet of the present invention does not have to write any unique code to parse or validate input parameters. In addition, the present invention provides an even richer environment in which a software developer may specify additional processing of the input parameters via directives.

Each directive handles its own error messages. If an error message needs to be displayed, the directive gets the localized string from a document store and calls the display interface to display the error message. Data related to documentation directives may be stored in the cmdlet, in an XML store or external database, or in resource files. Thus, the present invention can provide consistent error messages for all cmdlets and reduces the localization effort of third parties.

In addition, the reflection-based shell provides a common interface that returns data generated by one directive in a form of an object to the calling directive. The calling directive is responsible for casting the data to the required datatype. While Tables 1-5 illustrate representative directives for several categories, other directives may be added and additional categories may be added without departing from the scope of the present invention.

Thus, as described above, the present invention provides a mechanism for defining a grammar for input parameters to a cmdlet. The mechanism allows the developers to develop, test, and support cmdlets. The cmdlet has fewer lines of code, is faster to implement, has fewer defects, and has easier-to-address defects. The mechanism provides more consistency in syntax, semantics, error handling, resource management, security, and the like. The above discussion described the present invention within a NET framework. However, those skilled in the art will appreciate that the present invention may be implemented within any operating system that provides reflection capabilities. In addition, the present invention is described in a command-line embodiment. However, the parsable data that is parsed may be obtained through voice, a graphical user-interface, a script or the like without departing from the scope of the present invention. In addition, the present invention may be used to describe a rich set of grammars by allowing one RequestObject class to declare another RequestObject class. Thus, the present invention provides great versatility to system administrators.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A computer-readable storage media having computer executable instructions, the instructions, when executed, performing a method comprising:

receiving a parsable stream, in a reflection based shell, that includes an identifier associated with a command;

retrieving definitional information, from a registry, based on the identifier, wherein the definitional information describes an expected parameter for the command, the command as a registered command, and a class of the identifier;

reading metadata associated with the class of the identifier, wherein the metadata includes one or more directives associated with the command, wherein each directive includes error handling;

creating an object based on the class indicated by the definitional information, wherein the definitional information specifies a grammar of the object;

storing a parameter obtained from the parsable stream in the object in accordance with the definitional information associated with the expected parameter;

applying an applicability directive to insure the class is implemented in a designated role, wherein the designated role includes a machine role or a user role;

applying a processing directive on the parameter to manipulate the parameter before providing the object with the parameter to the command, the processing directive being associated with the definitional information including specific size limits for strings and for collections that can be processed;

applying a documentation directive to the parameter that, when requested, generates textual information about the parameter, the documentation directive being associated with the definitional information and providing a description of correct syntax when an invalid syntax is encountered; and providing the object to the command, the object having a method invocable by the command, wherein:

the definitional information and the plurality of directives are either derived from a reflection-based shell or extended by a developer of the command;

the reflection-bases shell provides one or more categories of directives and one or more directives under each category of directives; and the definition information and the plurality of directives associated with a first command are different from the definition information and the plurality of directives associated with a second command.

2. The computer-readable storage media of claim 1, wherein the parsable stream is entered on a command line.

3. The computer-readable storage media of claim 1, wherein the parsable stream is generated via voice input.

4. The computer-readable storage media of claim 1, wherein the parsable stream is generated programmatically.

5. A computer-readable storage media of claim 1, further providing intellisense as the parsable stream is being generated to autocomplete the parsable stream based on the definitional information, wherein the autocomplete occurs upon receiving a disambiguating portion of the parseable stream.

6. A computer-readable storage media of claim 1, further comprising:

applying a parsing directive that correlates the parameter to the expected parameter associated with the object, the parsing directive being associated with the definitional information, wherein the parsing directive correlates based on a set of rules which specify a manner in which the grammar of the object is converted to a syntax of the parameter received in the parsable stream;

verifying the syntax of the parameter;

correcting the syntax of the parameter based on syntax information from the documentation directive; and populating the object with the parameters.

7. A computer-readable storage media of claim 1, further comprising:

applying a parsing directive that determines a manner for obtaining the Parameter, including requesting the parameter from a user, the parsing directive being associated with the definitional information;

determining the parsable stream does not include a necessary parameter required for the object;

indicating the necessary parameter is needed by displaying a flag, wherein the flag indicates a permissible level of user interaction to supply the necessary parameter, the level of user interaction includes, user level, group level and enterprise level;

requesting the necessary parameter from the user.

8. A computer-readable storage media of claim 1, further comprising:

applying a data validation directive to determine whether the parsable stream meets a criterion specified by the data validation directive associated with the definitional information; and in response to applying the data validation directive, generating an validation error message, wherein the validation error message includes information from the documentation directive.

9. A computer-readable storage media of claim 1, further comprising applying a data generation directive on the parameter to generate a set of information that is stored in the object, the data generation directive being associated with the definitional information, wherein the data generation directive provides wildcard expansion of one or more of: filenames, usernames and processes.

10. A computer-readable storage media of claim 1, further comprising applying a second processing directive on the parameter to manipulate the parameter before providing the object with the parameter to the command, the processing directive being associated with the definitional information including specific type that objects are to be encoded.

11. A computer-readable storage media of claim 1, wherein the description of the correct syntax being stored in an Extensible Markup Language (XML) store.

12. A computer-readable storage media of claim 1, wherein the definition information and the plurality of directives associated with a first command are different from the definition information and the plurality of directives associated with a second command.

13. A system that performs reflection-based processing on parameters input to a command, the system comprising:

a processor; and a memory, the memory being allocated for a plurality of computer-executable instructions which are loaded into the memory for execution by the processor, the computer-executable instructions performing a method comprising:

receiving a parsable stream, in a reflection based shell, that includes an identifier associated with a command;

retrieving definitional information, from a registry, based on the identifier, wherein the definitional information describes an expected parameter for the command, the command as a registered command, and a class of the identifier;

reading metadata associated with the class of the identifier, wherein the metadata includes one or more directives associated with the command, wherein each directive includes error handling;

creating an object based on the class indicated by the definitional information, wherein the definitional information specifies a grammar of the object;

storing a parameter obtained from the parsable stream in the object in accordance with the definitional information associated with the expected parameter;

applying an applicability directive to insure the class is implemented in a designated role, wherein the designated role includes a machine role or a user role;

applying a documentation directive to the parameter that, when requested, generates textual information about the parameter, the documentation directive being associated with the definitional information and providing a description of correct syntax when an invalid syntax is encountered; and providing the object to the command, the object having a method invocable by the command, wherein;

the definitional information and the plurality of directives are either derived from a reflection-based shell or extended by a developer of the command;

the reflection-bases shell provides one or more categories of directives and one or more directives under each category of directives.

14. The system of claim 13, wherein the parsable stream is entered on a command line.

15. The system of claim 13, wherein retrieving definitional information includes identifying a class associated with the command.

16. The system of claim 15, wherein retrieving definitional information further includes reading metadata from the class.

17. The system of claim 13, wherein the computer-executable instructions further comprises applying a directive to the at least one parameter that performs processing on the parameter in accordance with the directive associated with the definitional information.

* * * * *

UNITED STATES PATENT AND TRADEMARK OFFICE
CERTIFICATE OF CORRECTION

PATENT NO.      : 7,624,401 B2
APPLICATION NO. : 10/883492
DATED           : November 24, 2009
INVENTOR(S)     : Jeffrey P. Snover et al.

It is certified that error appears in the above-identified patent and that said Letters Patent is hereby corrected as shown below:

In cover page, item (75), under "Inventors" column 1, line 2, delete "James W. Truher," and insert -- James W. Truher III, --, therefor.

In column 14, line 49, in Claim 2, delete "The" and insert -- A --, therefor.

In column 14, line 51, in Claim 3, delete "The" and insert -- A --, therefor.

In column 14, line 53, in Claim 4, delete "The" and insert -- A --, therefor.

In column 15, line 11, in Claim 7, delete "Parameter," and insert -- parameter, --, therefor.

In column 16, line 37, in Claim 13, delete "wherein;" and insert -- wherein: --, therefor.

Signed and Sealed this
First Day of February, 2011

David J. Kappos
*Director of the United States Patent and Trademark Office*